United States Patent [19]

Huvey et al.

[11] Patent Number: 5,556,601
[45] Date of Patent: Sep. 17, 1996

[54] PROCESS OF MANUFACTURING A TANK OF LOW UNITARY WEIGHT NOTABLY USABLE FOR STOCKING FLUIDS UNDER PRESSURE

[75] Inventors: Michel Huvey, Bougival; Jacques Cheron, Maisons Lafitte, both of France

[73] Assignee: Institut Francais du Petrole, Rueil Malmaison, France

[21] Appl. No.: 341,084

[22] Filed: Nov. 17, 1994

Related U.S. Application Data

[62] Division of Ser. No. 229,008, Apr. 18, 1994, Pat. No. 5,375,735, which is a continuation of Ser. No. 794,021, Nov. 19, 1991, abandoned.

[30] Foreign Application Priority Data

Nov. 19, 1990 [FR] France ................................. 90 14490

[51] Int. Cl.⁶ ................................................. B65H 81/00
[52] U.S. Cl. ........................... 156/172; 156/242; 156/245; 156/273.3
[58] Field of Search ..................... 156/172, 173, 156/175, 425, 245, 242, 273.3, 275.5; 264/506, 505, 540

[56] References Cited

U.S. PATENT DOCUMENTS

| | | | |
|---|---|---|---|
| 1,651,521 | 12/1927 | Girardville | 220/589 |
| 2,988,240 | 6/1961 | Hardesty | 220/590 |
| 3,100,171 | 8/1963 | Hardesty | 156/172 X |
| 4,191,304 | 3/1980 | Schiedat | 220/590 |
| 4,453,995 | 6/1984 | Morrisey | 156/172 |
| 4,811,761 | 3/1989 | Huvey | 156/172 X |

FOREIGN PATENT DOCUMENTS

| | | | |
|---|---|---|---|
| 2661477 | 10/1991 | France | 156/172 |
| 2421619 | 11/1975 | Germany | 156/425 |
| 2039980 | 8/1980 | United Kingdom | 156/172 |

*Primary Examiner*—Jeff H. Aftergut
*Attorney, Agent, or Firm*—Antonelli, Terry, Stout & Kraus

[57] ABSTRACT

The present invention describes a tank for fluids under pressure and the manufacturing process thereof. The tank consists of two bottoms (3, 4) separated by a corrugated cylindric zone (2), the corrugated cylindric zone being circumferentially armed, and of a longitudinal reinforcement (7) placed on the total outer structure of the tank which, while reproducing the bottom effect, allows to reduce the thickness of the bottoms and to lighten the tank. The process describes the manufacturing of a circumferentially and longitudinally armed tank.

12 Claims, 1 Drawing Sheet

PROCESS OF MANUFACTURING A TANK OF LOW UNITARY WEIGHT NOTABLY USABLE FOR STOCKING FLUIDS UNDER PRESSURE

This application is a Divisional application of application Ser. No. 229,008, filed Apr. 14, 1994, now U.S. Pat. No. 5,375,735, which application is a Continuation application of application Ser. No. 794,021, filed Nov. 19, 1991 abandoned.

BACKGROUND OF THE INVENTION

The present invention relates to a tank of low unitary weight capable of withstanding high pressures for fluids under pressure and the manufacturing process thereof.

The main features which such tanks must show are well-known, namely lightness and a resistance sufficient for withstanding the pressures exerted by the contained fluids.

Conveying compressed gas or liquids under pressure, such as liquefied butane or propane, in pressure-resisting tight bottles is well-known. These bottles are most often made of steel and the weight of the vessels represents at the very least the equivalent of the weight of the conveyed fluid. The result is that the handling of the empty bottles is nearly as difficult as the handling of the full bottles, and that the carriage expenses for the empty vessels after use are of the same order as those caused by the conveyance of the full vessels.

The technical problem posed here is not evident because the features of lightness and of resistance are often incompatible.

Light tanks, but incapable of withstanding relatively high pressures, or devices requiring the use of very costly material are described in prior art.

When materials of reasonable cost are used for developping such devices in the general public, for example the use of unidirectional composites with a thermoplastic matrix for manufacturing bottles, the structure of the bottle always comprises an inner sheath made of a metallic material. The main function of this sheath is to reproduce the bottom effect and secondarily to be tight. The result is a thickness which highly contributes to the total weight.

The invention described in patent U.S. Pat. No. 4,589,562 describes a tank structure designed for withstanding high pressures, thanks to the composite winding around the cylindric body thereof and part of the bottoms. But the winding does not cover the total bottoms and therefore does not sustain the bottoms, which does not allow to decrease the thickness thereof and thereby to lighten the tank.

SUMMARY OF THE INVENTION

The present invention describes tanks laid out in order to win a certain lightness while keeping a pressure resistance identical to or greater than the resistance of conventional tanks. The solution provided is the following: the structure consists of two hemispherical or ellipsoidal bottoms separated by a circumferentially and longitudinally armed corrugated circular cylindric zone, these bottoms being supported by longitudinal reinforcements compensating for the bottom effect of the tubular part. The presence of these reinforcements allows to reduce the thickness of the tank bottoms, while the assembly keeps a sufficient pressure resistance.

The manufacturing of circumferentially armed corrugated pipes is well-known and described in the applicant's French patent FR 2,553,860 (U.S. Pat. No. 4,811,761).

The structure constituted thereby presents the advantage of providing a unitary weight ranging between half and a sixth of the weight of the conventional steel tanks, while keeping a pressure resistance identical to the one of the bottles of the conventional technology.

The present invention also describes how to manufacture the tank, usable notably for stocking fluids under pressure.

The tank results from a combination of the shapes, the thicknesses and the dimensions, as well as from the implementing of appropriate technologies for manufacturing this tank or this bottle.

The tank usable for stocking fluids under pressure consists of an inner sheath formed by two bottoms separated by a corrugated cylindric body or zone and assembled to said cylindric body, said bottoms being provided with at least one opening and with closing means or means for communicating with the outside (said means can be valves or a stopper and a valve), and means for withstanding the longitudinal traction, wherein the inner sheath of the cylindric zone comprises corrugations, the winding curves of said cylindric zone having a circumferential or helicoidal shape with a low pitch, the outer hollows of the corrugations of said inner sheath being filled with a composition comprising reinforcing fibers, and wherein the means for withstanding the longitudinal traction or longitudinal reinforcement are placed on the total outer structure of the tank, except for the openings.

The longitudinal reinforcement can consist of fibers laid out in such a way that the fibers run around the poles of the bottle, or polar winding, or of a braid set on the outer structure of the tank.

The process for manufacturing the tank comprises the following stages:

(a) achieving the inner sheath of a tank consisting of two hemispherical or ellipsoidal bottoms and of a cylindric zone comprising circumferential corrugations, (b) filling on at least part of the height H thereof the hollow outer portions of the part of the corrugated inner sheath of the tank which is substantially cylindric with a composition comprising a fiber-reinforced stabilizable resin, (c) subjecting the vessel armed therewith over at least part of the length thereof to a treatment allowing to stabilize the stabilizable composition, (d) depositing on the total outer structure of the tank circumferentially armed therewith, except for the openings, a longitudinal reinforcement.

Stage (a) can be achieved following two ways. An inner sheath of a tank is obtained either through a manufacturing stage where an extrudable material is moulded by extrusion-blowing in a mold whose wall consists of a cylindric zone comprising circumferential corrugations and hemispherical or ellipsoidal bottoms, or through a manufacturing stage in which hemispherical or ellipsoidal bottoms are fixed by fastening means to the two ends of a corrugated cylindric zone, the bottoms showing openings.

According to preferred embodiment procedures, among which some can be achieved simultaneously:

The extrudable material can be either a metal or a thermoplastic resin.

The resin is for example a photocurable resin and stage (c) is achieved by exposing said assembly to the action of an ultraviolet ray lamp.

The resin is for example a heat convertible resin and the assembly is maintained during the stabilization stage in conditions allowing the crosslinking to take place.

The resin is for example a thermosetting resin and the stabilization is achieved by heating said assembly until a temperature allowing the hardening of the resin is reached.

The longitudinal reinforcement of the cylindric zone, which also provides the supporting of the bottoms, consists of fibers deposited on the outer structure of the tank by helicoidal or polar winding, and/or of a braid set on the outer structure of the tank.

The longitudinal reinforcement consists for example of an aramid wick impregnated with a thermoplastic elastomer, the ends of the wick being fastened by gluing onto the ends of the tank.

After stage (b), a sheath made of a material substantially non permeable to said resin can for example be deposited, in order to maintain the latter substantially in place in said hollow outer portions of the corrugated pipe, before starting stage (d). In this way, the stabilization treatment is performed at the same time as the winding. The deposited sheath can possibly be a simple helicoidal coil of a plastic or elastomeric band whose thickness can be low, since this band normally no longer has a part to play after the hardening of the resin.

In all the manufacturing variants described above, at least one end of the tank is fitted with a system allowing to communicate with the outside or providing a tight closing.

The tank for fluids under pressure obtained thereby can possibly be externally lined with a protective layer, for example by projecting a thermoplastic elastomer after stage (d).

In order to reinforce the protection of the tank, it can be placed in a protective jacket consisting for example of a container made of corrugated cardboard, the space between the box and the tank being filled with an expansible composition based on phenolic resin.

BRIEF DESCRIPTION OF THE DRAWINGS

Other aims, features, details and advantages of the invention will be clear from reading the description hereafter with reference to the accompanying drawings given by way of example, illustrating various embodiment procedures of the invention, and in which.

DESCRIPTION OF THE PREFERRED EMBODIMENTS

Figure 1:
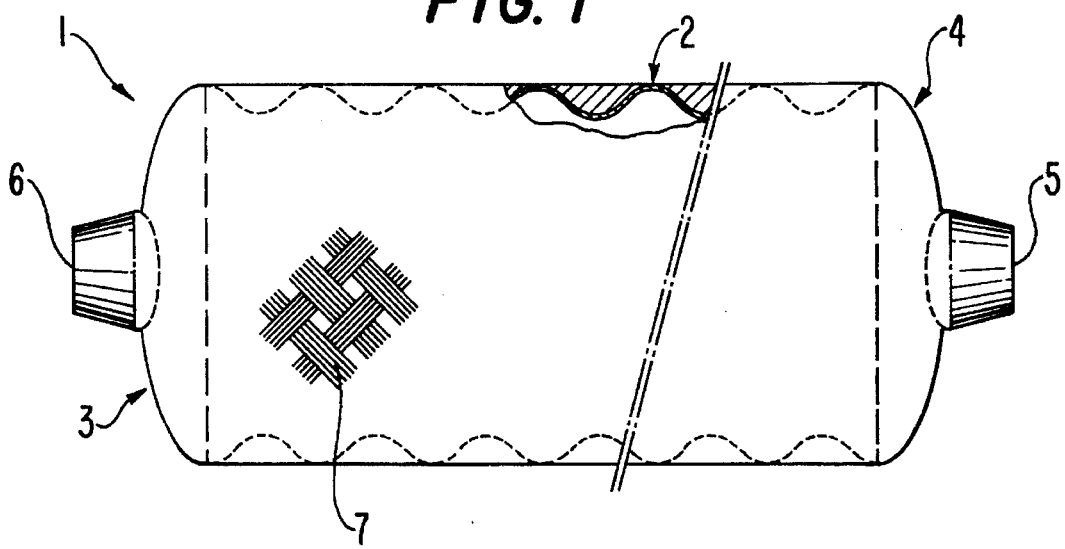
FIG. 1 describes a light structure or tank for stocking fluids as obtained with the process of the invention.

FIG. 1 shows a tank 1 whose inner sheath comprises a corrugated cylindric zone 2, two bottoms 3, 4 located at the ends of the cylindric zone, said bottoms being equipped with two valves 5, 6 located at the ends of the tank and means for withstanding the longitudinal traction or longitudinal reinforcement 7.

The bottoms 3, 4 have an ellipsoidal or hemispherical shape.

The tight sheath of the bottoms 3, 4 can be advantageously of the same nature as the corrugated sheath constituting the cylindric zone 2 of the tank, although it may be of a different nature. Using products of the same nature for the sheath of the bottoms and the sheath of the corrugated cylindric zone allows a tight weld which shows mechanical qualities equivalent to those of the standard length.

The connection between the bottom 3, 4 and the body of tank 2 will be achieved by gluing or by brasing in case the products are of different natures, except of course if the bottoms and the corrugated cylindric part have been moulded in a single operation.

The bottoms 3, 4 can be achieved by stamping, thermoforming, injection, or any other usual process.

The extreme zones of the bottle will be equipped with valves or with stoppers 5, 6 such as those standardized for the storage of liquefied gas or compressed gas.

The longitudinal reinforcement 7 is deposited on the total outer structure of the tank 1, except for the openings.

The longitudinal reinforcement 7 can consist of fibers deposited on the structure by polar winding or of a braid set on the total structure.

The purpose of the longitudinal reinforcement 7 is to compensate for the bottom effect of the cylindric or tubular part of the tank. The presence of said reinforcement on the bottoms 3, 4 allows to reduce the thickness of bottoms 3, 4.

Figure 2:
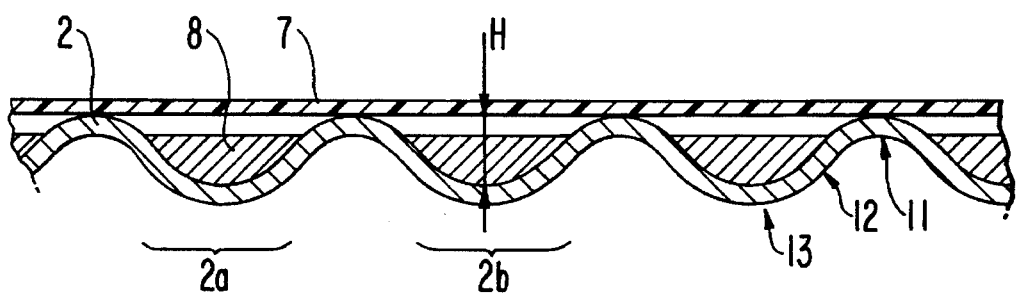
FIG. 2 shows a cross-section of a portion of the corrugated cylindric zone of the tank, following the longitudinal axis of the tank.

More precisely, FIG. 2 shows the structure of the portion of the armed corrugated inner sheath forming the cylindric zone of the tank, such as the one which is described in the applicant's French patent application EN 90/05,507.

The hollow portions 2a, 2b of the corrugated inner sheath are filled with a resin armed with fibers 8 over almost the total height H thereof. It is essential to fill the hollow portions from the bottom (which corresponds to the outer face of said sheath) up to the zone where the bending radius of the outer zone of the corrugation of the sheath becomes substantially constant (varies by less than 10%).

The corrugated sheath consists of alternating ridges and grooves formed by successive circle portions 11, 13, and these circle portions can be separated or not by substantially rectilinear portions 12 shown in a cross-sectional view, and corresponding to substantially conic zones in a spatial representation.

The shapes constituted by the successive hollow and embossed or ridged portions can constitute successive rings or show a helicoid form.

Using a structure of the "accordion" type can be done without departing from the scope of the present invention. In this case, the hollow portion can be substantially filled over the total height thereof. In the same way, the corrugation can be sinusoidal or approximately so.

The means for withstanding the longitudinal traction such as, for example, fibers or a braid, are diagrammatically shown on FIG. 2 and designated by reference 7.

Figure 3:
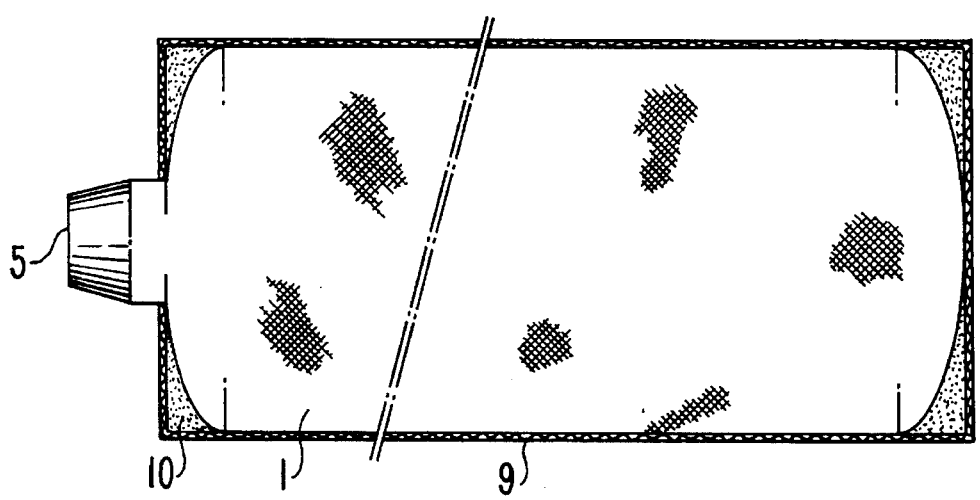
FIG. 3 shows a light structure or tank for stocking fluids as obtained with the process of the invention and in the final use thereof.

FIG. 3 shows a storage tank in the final use thereof.

The tank 1 is placed in a container 9 made of corrugated cardboard. Only the closing means or the means for communicating with the outside, for example on the figure a valve 5, are located outside the container 9. The empty space located between the walls of the container and the tank is filled with a material 10 showing a good behaviour in case of a fire, such as an expansible composition based on a phenolic resin. The assembly consisting of the container 9 and the material 10 constitutes a protective covering against shocks and the heating of the assembly.

Besides, this lay-out facilitates the transportation and the storage of the tank.

In the following description, what is called circumferential arming is the operation allowing to deposit the composition comprising reinforcing fibers in the outer hollow of the corrugations of the tank, and longitudinal arming, the operation through which the means for withstanding the longitudinal traction are deposited.

According to a first manufacturing procedure, a mold whose cylindric zone comprises circumferential corrugations and which has hemispherical or ellipsoidal bottoms is used. Through an extrusion-blow moulding process, bottles made of a little permeable thermoplastic material, such as polyethylene glycol terephthalate, are achieved. The inner sheath of a tank is obtained thereby.

The ends of the tank are thereafter equipped with a valve and a stopper or with two valves.

The circumferential arming operation comprises a stage of filling the hollows of the winding curves, followed by a stage of stabilization treatment of the composition comprising reinforcing fibers.

During the filling stage, the tank constituted thereby is placed on a filament winding machine by means of which the hollow outer portions of the cylindric part of the inner sheath are filled with wicks of glass filaments preimpregnated with a photocurable composition. The proportion by volume of fibers is about 50%.

The tank obtained thereby is then subjected to the treatment for stabilizing the photocurable composition comprising reinforcing fibers.

In the specific case of this manufacturing, the treatment results from the action of an ultraviolet ray lamp during about 5 minutes, until the crosslinking of said photocurable composition is obtained.

This treatment can be carried out when the bottle is on the winding machine.

The longitudinal arming operation is carried out as follows.

The tank is placed again on the same winding machine by means of which a polyaramid layer (Kevlar or Twaron) preimpregnated with a 0.2 mm-thick partly hydrogenated thermoplastic elastomer of the Styrene-Isopropene-Styrene type is deposited. The wicks deposited thereby are stuck onto the ends of the tank by adding some drops of an elastomer solvent. This solvent can be trichloroethylene.

Any other means providing a reliable holding of the wicks can be used.

It is also possible to add a complementary protection by setting the tank constituted thereby in a container, for example made of corrugated cardboard, and to fill the space between the container and the tank with a foam showing a good behaviour in case of a fire, for example an expansible composition based on phenolic resin or any other material fulfilling the same purpose.

By way of comparison with prior art, the mass of the tank constituted thereby is 0.7 kg, which roughly corresponds to an eighth of the mass of a conventional tank (6 kg) for the same capacity, while keeping the same bursting pressure behaviour.

In another manufacturing embodiment procedure, a pipe made of stainless steel which has been previously corrugated according to the technique described in the French patent application EN 90/05,507 cited above, on which hemispherical or ellipsoidal bottoms of the same material are welded, is used, the bottoms being located at the ends of the ferrule formed by the corrugated cylindric part of the inner sheath. The welding means used in this process are well-known and will therefore not be described. The thickness of the bottoms is about 1 mm.

In the same way as in the description above, the circumferential arming operation comprises a stage of filling of the hollows of the corrugations, followed by a stage of stabilization treatment of the composition comprising reinforcing fibers.

In order to fill the hollows of the corrugations, the tank constituted thereby is placed on a winding machine, which allows to fill the outer grooves or hollow portions of the corrugated inner sheath with a thermosetting prepreg of glass fibers-epoxy resin in a proportion by volume of 50%/50%.

The tank obtained thereby is subjected to the hardening treatment.

In the precise case of this manufacturing process, the treatment consists in placing the structure in a stove for one hour at 90° C., then for one hour at 140° C.

The longitudinal arming operation is carried out as follows.

After cooling, the product is repositioned on the winding machine cited above. An aramid wick allowing to provide the resistance to the longitudinal stress due to the pressure is then deposited by polar winding, i.e. by making the longitudinal reinforcement pass around the poles of the tank.

A braid serving as a longitudinal reinforcement can also be deposited.

By way of comparison with prior art, the mass of the tank constituted thereby is 2.1 kg, which roughly corresponds to one third of the mass of a conventional tank (6 kg) for the same capacity, while keeping the same bursting pressure behaviour. The bursting pressure of this tank is higher than 0.6 MPa.

In the same way as in the manufacturing process described above, the tank obtained thereby can be wrapped with the additional protection consisting of a corrugated cardboard container and a material showing a good behaviour in case of a fire.

Another way of achieving the manufacturing of such a bottle consists, during the circumferential arming operation, in replacing the previous glass fibers-epoxy prepreg by a ribbon of glass fibers impregnated with a 2 mm-wide and a 0.35 mm-thick polyamide 12.

In this case, the treatment for stabilizing the composition comprising reinforcing fibers consists in running the product obtained thereby through an air current heated up to 265° C. over a length sufficient for the resin to melt over a depth of about 0.01 mm. The hot air current licks the surface of the composite already placed in a hollow outer portion of the part of the corrugated sheath upstream from the placing point, so that the surface of the composite already placed slightly melts or highly approaches the melting temperature thereof. The fiber ribbon placed thereby knits together with the one already in place at the placing point, which provides the reinforcement with an excellent cohesion, whereas it will show no adhesion on the corrugated metal sheath, insufficiently heated to allow such an adhesion, but still sufficiently to allow the resin to follow the exact shape of this sheath, bringing thereby the local stresses corresponding to the pressure back to the value of the average stresses, which is naturally obtained with the hardenable composites used in the liquid state.

The invention is not limited to the use of any particular thermosetting resin. It will for example be possible to admix a resin with the hardener thereof to impregnate the filaments which will be used for filling the hollow outer portions of the corrugated pipe, and to heat thereafter. A vulcanization can also be achieved by filling the winding curves with filaments previously impregnated with latex with sulfur added.

It is also possible to use a phenol-formaldehyde resin, a melamine-formaldehyde resin, an urea-formaldehyde resin, an epoxy resin, a polyester or a vinylester resin, or an alkyd resin, or to set in the hollow portions of the corrugated pipe wicks consisting of a mixture of reinforcing fibers and of fusible thermoplastic fibers or reinforcing fibers filled with fusible thermoplastic resin powder, then, after winding, to carry out a thermal treatment allowing to obtain the melting of the thermoplast before starting the cooling which provides the hardening of the assembly.

It is also possible to heat the wick comprising reinforcing fibers and the fusible resin, for example by means of a torch, just before the placing point in order to melt the resin just before depositing the impregnated wick. The later thermal treatment is then useless. The fact that the circumferential reinforcement is discontinuous in the axial direction of the tank, and that it is not linked to the longitudinal reinforcement, prevents microcracking phenomena.

Using composites with a thermoplastic matrix in all the processes described above can afford the advantage of suppressing the complementary stabilization operation after the winding, since this stabilization can be achieved by cooling during the winding itself.

We claim:

1. A process for manufacturing a tank for containing fluids under pressure, comprising:

(a) providing an inner sheath comprised of two hemispherical or ellipsoidal bottoms and of a corrugated cylindrical zone having circumferential corrugations providing alternating ridges and grooves arranged from one end to the other end of said zone, said grooves defining hollow outer portions on the cylindrical zone and at least one of the bottoms including at least one opening and means in said at least opening for enabling selective communication with an interior of the inner sheath, (b) filling at least part of each of the hollow outer portions of the corrugated cylindrical zone of the inner sheath with a composition comprising a stabilizable resin and reinforcing fiber for reinforcing the corrugated cylindrical zone of the inner sheath, (c) subjecting the reinforced corrugated cylindrical zone to a treatment which effects stabilization of the stabilizable composition, and (d) depositing on an entire outer surface of the reinforced sheath, except for the at least one openings, a longitudinal reinforcement for withstanding longitudinal traction to provide a reinforced tank.

2. A process according to claim 1, wherein the stage (a) is effected by extrusion-blow molding an extrudable material in a mold having wall portions comprised of a cylindrical zone comprising circumferential corrugations and hemispherical or ellipsoidal bottoms.

3. A process according to claim 2, wherein the extrudable material is a thermoplastic resin.

4. A process according to claim 1, wherein stage (a) is effected by fixing the hemispherical or ellipsoidal bottoms with fastening means to each end of the corrugated cylindrical zone.

5. A process according to claim 1, wherein the resin is a photocurable resin and stabilization is effected by exposing said resin to an ultraviolet ray lamp.

6. A process according to claim 1, wherein the resin is a heat convertible resin which is stabilized under conditions effecting cross-linking of said resin.

7. A process according to claim 1, wherein the resin is a thermosetting resin and stabilization is effected by heating said resin to a temperature which hardens the resin.

8. A process according to claim 1, wherein the longitudinal reinforcement comprises an aramid winding impregnated with the thermoplastic elastomer, ends of the winding being fastened by an adhesive at ends of the bottoms.

9. A process according to claim 1, wherein after stage (d), a solution of a thermoplastic elastomer is formed on the reinforced tank to provide a protective layer.

10. A process according to claim 1, wherein after stage (b), a sheath made of a material substantially non-permeable to said resin is wound around the filled portions of said hollow outer portions of the corrugated cylindrical zone.

11. A process according to claim 10, wherein stabilization is effected at the same time as winding of the sheath made of a material substantially non-permeable to said resin.

12. A process according to claim 1, further comprising positioning the reinforced tank in a protective jacket after stage (d).

* * * * *